US012560929B2

(12) United States Patent
Kalin et al.

(10) Patent No.: US 12,560,929 B2
(45) Date of Patent: Feb. 24, 2026

(54) SYSTEMS AND METHODS FOR AUTONOMOUS VEHICLE PATH PLANNING

(71) Applicant: The Boeing Company, Arlington, VA (US)

(72) Inventors: Joshua D. Kalin, Huntsville, AL (US); Nick S. Evans, Lynwood, WA (US); Taylor S. Loper, Huntsville, AL (US); Joseph E. Fagerburg, Madison, AL (US)

(73) Assignee: The Boeing Company, Arlington, VA (US)

( * ) Notice: Subject to any disclaimer, the term of this patent is extended or adjusted under 35 U.S.C. 154(b) by 283 days.

(21) Appl. No.: 18/356,744

(22) Filed: Jul. 21, 2023

(65) Prior Publication Data

US 2025/0028319 A1     Jan. 23, 2025

(51) Int. Cl.
| | |
|---|---|
| *G01C 21/00* | (2006.01) |
| *B60W 60/00* | (2020.01) |
| *G05D 1/00* | (2006.01) |
| *G06V 10/82* | (2022.01) |
| *G06V 20/56* | (2022.01) |

(52) U.S. Cl.
CPC ......... *G05D 1/0212* (2013.01); *G05D 1/0246* (2013.01); *G05D 1/027* (2013.01); *G05D 1/0274* (2013.01); *G06V 10/82* (2022.01); *G06V 20/56* (2022.01)

(58) Field of Classification Search
CPC .... G05D 1/0212; G05D 1/0246; G05D 1/027; G05D 1/0274; G05D 2105/87; G05D 2107/38; G05D 1/2435; G05D 1/2464; G05D 2111/52; G05D 1/644; G05D 2101/20; G05D 2109/10; G05D 2111/10; G05D 2111/64; G06V 10/82; G06V 20/56
See application file for complete search history.

(56) References Cited

U.S. PATENT DOCUMENTS

| | | | |
|---|---|---|---|
| 2019/0051056 A1* | 2/2019 | Chiu ...................... | G06F 16/903 |
| 2020/0293057 A1* | 9/2020 | Reid ....................... | G06V 20/56 |
| 2022/0026918 A1* | 1/2022 | Guizilini ............... | G01S 17/931 |
| 2023/0038422 A1* | 2/2023 | Redden ................. | G06V 20/56 |
| 2024/0193915 A1* | 6/2024 | Fenlon ................. | G06V 10/764 |

FOREIGN PATENT DOCUMENTS

| | | | | |
|---|---|---|---|---|
| CN | 116105749 A | * | 5/2023 | ............. G01C 21/32 |

OTHER PUBLICATIONS

Machine Translation of CN-116105749-A (Year: 2023).*

(Continued)

*Primary Examiner* — Sahar Motazedi

(74) *Attorney, Agent, or Firm* — HANLEY, FLIGHT & ZIMMERMAN, LLC

(57) ABSTRACT

Systems and methods for autonomous vehicle path planning are described herein. An example vehicle includes an image sensor to obtain an image of a scene of an area surrounding the vehicle. The vehicle also includes navigation system circuitry to: analyze the image and generate a semantically segmented image that identifies one or more types of features in the image; project the semantically segmented image to a two-dimensional (2D) map projection; convert the 2D map projection into a cost map; and determine a path for the vehicle based on the cost map.

18 Claims, 13 Drawing Sheets

(56)          References Cited

OTHER PUBLICATIONS

NASA, "https://mars.nasa.gov/imgs/mer/technology/auto nav1.
jpg" downloaded on Jul. 21, 2023, 1 page.
NASA, "https://mars.nasa.gov/" Lunar Rover Vehicle (Apollo 15,16,17),
Curiosity Rover, Perseverence Rover, Opportunity Rover, retrieved
Jul. 21, 2023, 5 pages.

* cited by examiner

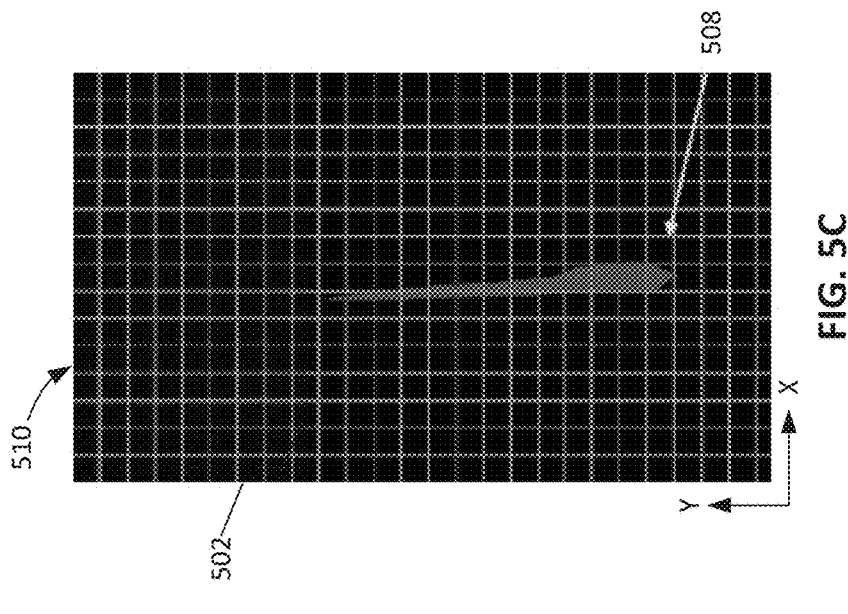
FIG. 5C
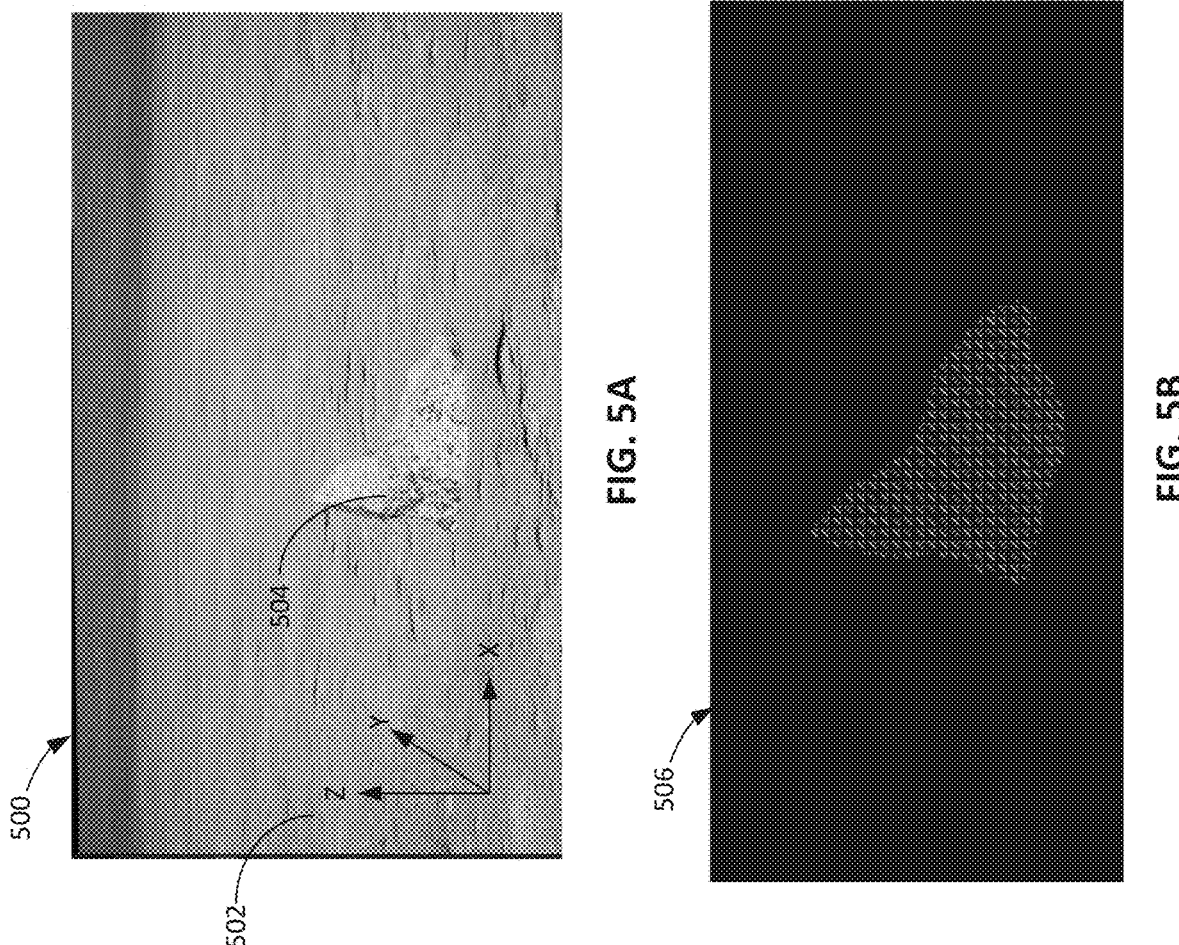
FIG. 5A
FIG. 5B

SYSTEMS AND METHODS FOR AUTONOMOUS VEHICLE PATH PLANNING

FIELD OF THE DISCLOSURE

This disclosure relates generally to autonomous vehicles and, more particularly, to systems and methods for autonomous vehicle path planning.

BACKGROUND

Autonomous vehicles typically utilize a group of sensors to produce sensor maps, which can be used to plan a path for navigating the vehicle to a target location.

SUMMARY

An example vehicle disclosed herein includes an image sensor to obtain an image of a scene of an area surrounding the vehicle. The vehicle also includes navigation system circuitry to: analyze the image and generate a semantic segmentation image that identifies one or more types of features in the image; project the semantic segmentation image to a two-dimensional (2D) map projection; convert the 2D map projection into a cost map; and determine a path for the vehicle based on the cost map.

Disclosed herein is a non-transitory machine readable storage medium including instructions that, when executed, cause programmable circuitry of a vehicle to: access an image of a scene of an area surrounding the vehicle, the image obtained by an image sensor on the vehicle; analyze the image and generate a semantic segmentation image that identifies one or more types of features in the image; project the semantic segmentation image to (two-dimensional) 2D map projection; convert the 2D map projection to a cost map; and determine a path for the vehicle based on the cost map.

BRIEF DESCRIPTION OF THE DRAWINGS

FIG. 5A is another example image obtained by the example image sensor of FIG. 1 showing a ground surface and a rock.

FIG. 5B is an example semantic segmentation image generated by the example navigation system circuitry of FIG. 2 based on the example image of FIG. 5A.

FIG. 5C is an example 2D map projection of the example semantic segmentation image of FIG. 5B as generated by the example navigation system circuitry of FIG. 2.

FIG. 6 is an example cost map generated by the example navigation system circuitry of FIG. 2.

In general, the same reference numbers will be used throughout the drawing(s) and accompanying written description to refer to the same or like parts. The figures are not necessarily to scale.

DETAILED DESCRIPTION

Figure 1:
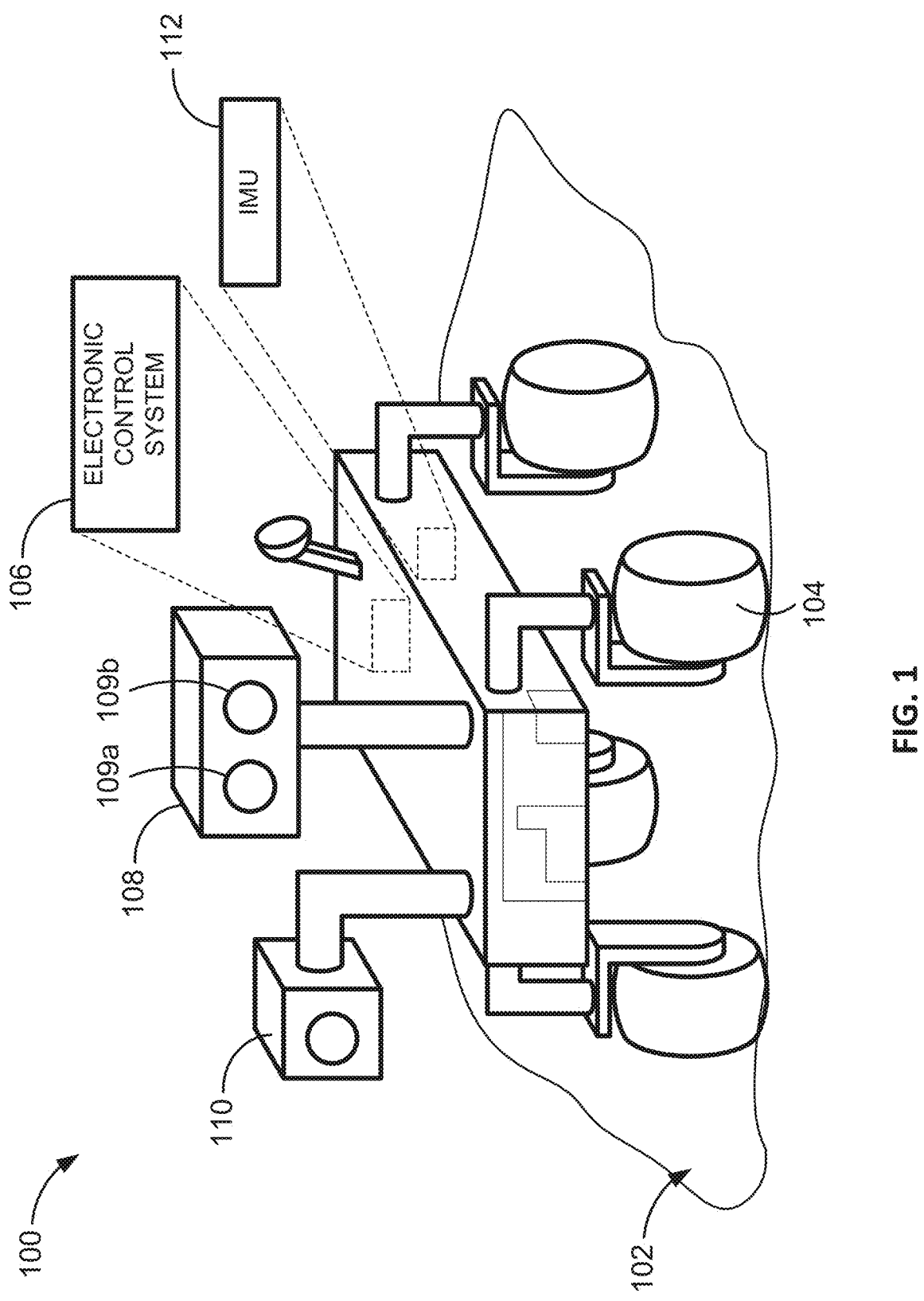
FIG. 1 illustrates an example vehicle including an example image sensor and an example electronic control system in which the example techniques disclosed herein can be implemented.

Disclosed herein are example navigation systems and methods for collision avoidance and path planning for a vehicle. The example navigation systems and methods can efficiently plan a path for the vehicle based on images from a single (monocular) image sensor. This results in lower weight, complexity, and processing power compared to known navigation systems and hardware. The examples disclosed herein are advantageous for autonomous vehicles and can operate to autonomously navigate a vehicle to a target location while identifying and avoiding collisions with certain hazards. The example techniques disclosed herein can be used as the primary or sole path planning resource or can be used as a fail-safe or backup in the event that another primary sensor system fails.

Some known autonomous vehicle navigation systems utilize a stereo camera or multi-camera system that includes two or more cameras. The cameras take overlapping images of a scene in front of the vehicle. The images are analyzed to identify the depth of features in the scene. For example, lunar rovers include a stereo camera system that obtains images of the lunar terrain and analyzes the images to determine a path to a target location. The images are analyzed to detect the depth of features and determine a path around the features. However, this type of system requires both cameras to remain operational at all times. If one of the cameras becomes inoperable (e.g., fails) and/or is otherwise unavailable, the entire system becomes inoperable. Further, these multi-camera systems are often relatively large, heavy, and require a certain amount of power to operate. It is often desired to reduce these parameters, especially on vehicles that are sent to celestial bodies such as the moon and mars. Further, stereo vision cameras use classical image processing techniques and result in relatively slow scene interpretation. As such, the vehicle must travel at a relatively slow speed to ensure the scene is interpreted before traveling further along the path. For instance, rovers typically use a stop and look technique and, therefore, move relatively slow (e.g., 2 inches/second)

Example systems and methods disclosed herein can analyze an image from a single image sensor and plan a path based on the analysis of the image. Therefore, in some examples, a single image sensor can be used on the vehicle for path planning. This significantly reduces size, weight, and power requirements of the navigation system hardware. The examples disclosed herein can be used with different types of image sensors, such as an RGB camera, a thermal infrared sensor, or a hyperspectral imaging sensor. In some examples, the vehicle may include a stereo camera system, but may also include a separate image sensor that can be used if the stereo camera system becomes inoperable. As such, the example techniques can be used as a fail-safe or backup in case a primary sensor system fails. As another example, the images from the additional image sensor can be used to supplement the image processing of the stereo camera system. Additionally or alternatively, the example techniques disclosed herein can be used to analyze images from one of the cameras of the stereo camera system. For example, if one of the cameras of the stereo camera system fails, images from the other camera can still be used for path planning. The example techniques disclosed herein are also quicker than known stereo vision processing techniques. This enables the vehicle to travel faster because scenes can be interpreted more quickly.

The example navigation systems and methods disclosed herein utilize semantic segmentation to identify or classify hazards of interest, such as rocks, holes, people, etc. in the scene of the image. As such, unlike classical image processing techniques, the examples disclosed herein actually identify or classify the types of features in the image. This provides a more accurate understanding of the types of hazards and helps better plan a path around the hazards. Depending on the type of sensor, this analysis can also be used to identify the type of surface and whether the surface is not ideal for driving (e.g., an icy surface). After the semantic segmentation is performed, the image is projected on a 2D map projection (e.g., an overhead or birds-eye view). The 2D map projection is then converted into a cost map. The cost map includes cells with values indicating the relative safety of driving in the area corresponding to the cells. The cost map is used to generate a path for driving to a target location while avoiding the hazard(s).

In some examples, the semantic segmentation is performed by executing a machine learning model (e.g., a Convolutional Neural Network). The machine learning model identifies the one or more types of features in the image and creates a semantic segmentation mask or image. In some examples, the machine learning model is pre-trained with images of similar environments, such as images from other rovers and/or missions on the celestial body. Additionally or alternatively, the machine learning model can be trained based on images from the vehicle, such as at the start of the mission, which results in more effective training in the local environment. This also results in an adaptable perception process.

Therefore, the examples disclosed herein utilize a combination of machine learned perception and computer vision techniques to enable rapid scene analysis and spatial hazard detection. This enables rapid cost map formulation and enables localized path planning via a monocular based image sensor. This also enables the vehicle to travel at higher speeds because the scene can be analyzed and interpreted more quickly. The examples disclosed herein can also increase fidelity of current depth sensing and collision avoidance technologies. As disclosed above, the image sensor can be implemented by different types or forms of 2D sensors. Each type of sensor can provide different properties about detected hazards leading to more intelligent decision making on hazard avoidance.

FIG. 1 illustrates an example vehicle 100 in which the example navigation systems and methods disclosed herein can be implemented. In the illustrated example, the vehicle 100 is depicted as a type of a rover (e.g., a lunar rover). The vehicle 100 may be an autonomous vehicle that can be sent to a celestial body (e.g., the moon, Mars, etc.) and navigate along the surface of the celestial body. However, the example navigation systems and methods disclosed herein can also be implemented in other types of vehicles on Earth, such as autonomous cars, robots, etc. In FIG. 1, the vehicle 100 is shown as driving on a surface 102, which may correspond to the surface 102 (e.g., regolith, dirt, rock, etc.) of the celestial body. Otherwise, when implemented as an Earth-based vehicle, the surface 102 can correspond to any surface such as the ground (e.g., a rocky terrain) or a manmade structure (e.g., a road, a sidewalk etc.).

In the illustrated example of FIG. 1, the vehicle 100 includes one or more wheels 104 (one of which is referenced in FIG. 1). The wheels 104 can be powered and steered by one or more motors to drive the vehicle 100 along the surface 102. In other examples, the vehicle 100 can include other types of propulsion systems (e.g., a continuous track, a jet engine, a fan, etc.) to power and/or steer the vehicle 100.

In the illustrated example, the vehicle 100 includes an electronic control system 106. The electronic control system 106 includes the electronic components (e.g., processors, computing devices, memory, etc.) for controlling various functions and operating the vehicle 100. For example, when implemented as a lunar vehicle or rover, the electronic control system 106 can autonomously plan a route to a target location and drive/steer the vehicle 100 along the route. As disclosed in further detail herein, the electronic control system 106 include a navigation system that analyzes images of the surrounding terrain and plans the path based on the analysis of the images. The navigation system receives images from one or more sensors (e.g., imaging sensors) of a scene of an area surrounding the vehicle 100.

In some examples, the vehicle 100 includes a stereo camera 108, which includes a pair of cameras 109a, 109b (i.e., image sensors). The stereo camera 108 may also be referred to as a stereoscopic camera or stereo vision sensor. The cameras 109a, 109b obtain overlapping images of the scene or terrain in the surrounding environment. In some examples, the images are analyzed by the electronic control system 106 to reconstruct the surrounding environment and plan a path or route to the target location.

In the illustrated example, the vehicle 100 also includes an example image sensor 110, which may also be referred to as a 2D sensor. The image sensor 110 can also obtain images of a scene of an area surrounding the vehicle 100. In some examples, the image sensor 110 is in a fixed position or direction (e.g., forward) relative to the body of the vehicle 100. In other examples, the image sensor 110 can be moveable. In some examples, the image sensor 110 is a camera, such as an RGB camera or RGBD camera. In other examples, the image sensor 110 can be another type of image sensor, such as a thermal infrared sensor or a hyperspectral imaging sensor. As disclosed in further detail herein, the navigation system can analyze the images from the image sensor 110 and effectively plan a safe path for the vehicle 100 to drive based on the images. Therefore, the navigation system can operate using only one image sensor. In some examples, the image sensor 110 is used as a backup or redundant system in case the stereo camera 108 fails or becomes inoperable. In some examples, the vehicle 100 may only include the image sensor 110, and may not include the stereo camera 108. As such, the vehicle 100 may be navigated using only the images obtained from the image sensor 110. This eliminates the need for the stereo camera 108, thereby reducing weight, costs, and complexity. Further, in other examples, the techniques implemented by the navigation system can be used to analyze images from just one of the cameras of the stereo camera 108. For example, if one of the cameras 109a, 109b of the stereo camera 108 fails, images from the other operable camera can still be used to safely route the vehicle 100 to the target location.

In the illustrated example the vehicle 100 includes an inertial measurement unit 112 (IMU). The IMU 112 can include one or more sensors (e.g., accelerators, gyroscope sensors, etc.) that can be used to determine the attitude of the vehicle 100, as well as specific forces or angular rates indicative of velocity and acceleration of the vehicle 100.

Figure 2:
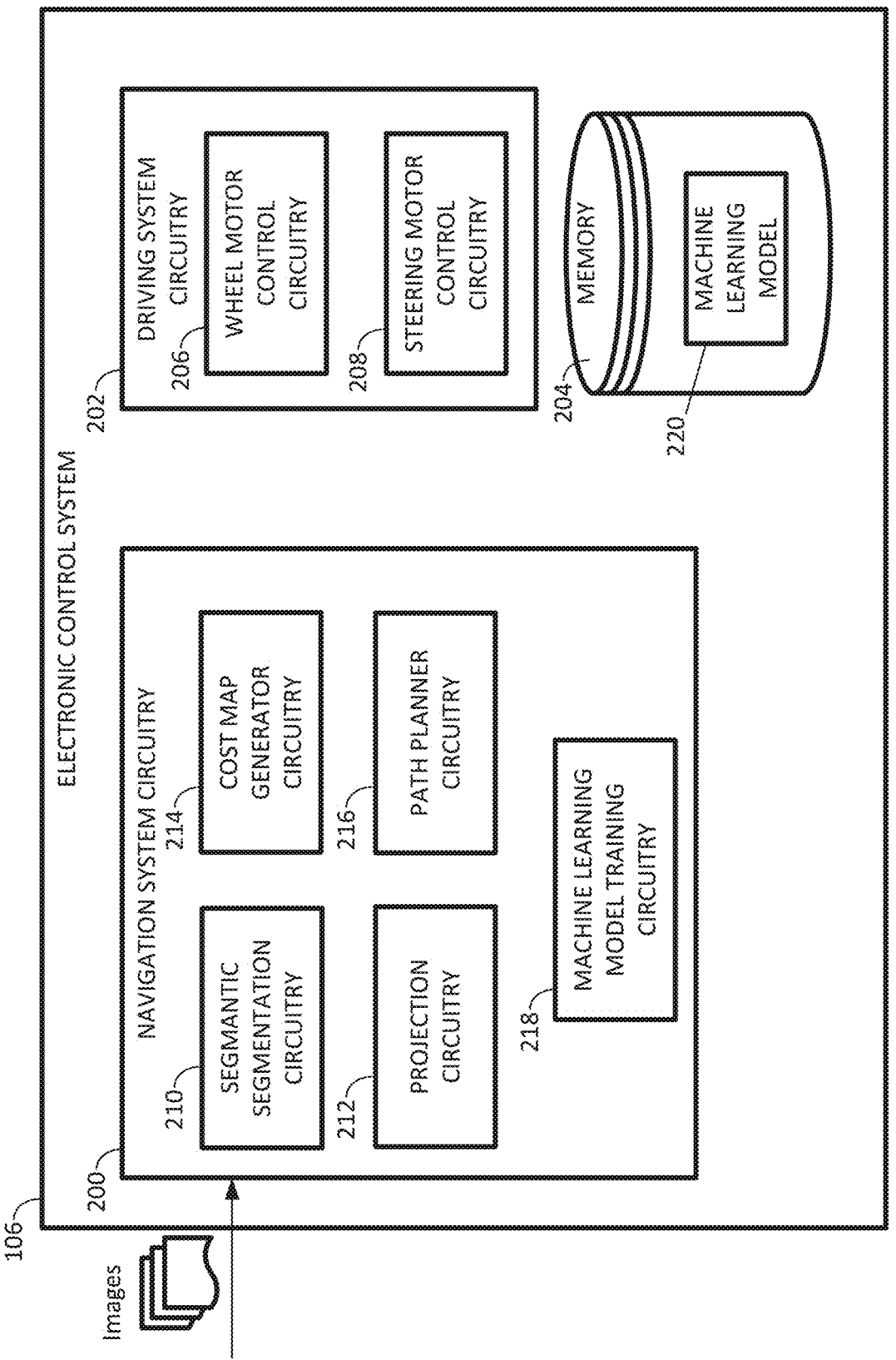
FIG. 2 is a block diagram of an example implementation of the electronic control system of FIG. 1 including example navigation system circuitry, example driving system circuitry, and an example memory.

FIG. 2 is a block diagram of an example implementation of the electronic control system 106 of FIG. 1. In the illustrated example the electronic control system 106 includes navigation system circuitry 200, driving system circuitry 202, and a memory 204. The navigation system circuitry 200 and/or the driving system circuitry 202 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the navigation system circuitry 200 and/or the driving system circuitry 202 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

As shown in FIG. 2, the navigation system circuitry 200 receives images taken by the image sensor 110 (FIG. 1). The image sensor 110 may transmit the images to the navigation system circuitry 200 wirelessly or via a wired/physical interface (e.g., RJ-45, Universal Serial Bus (USB), Controller Area Network bus (CANbus), etc.). In some examples, the navigation system circuitry 200 stores the images in the memory 204. Additionally or alternatively, the images may be stored in the memory 204 first, and then accessed by the navigation system circuitry 200. In some examples, the image sensor 110 obtains and outputs images at a set frequency, such as 10 Hertz (Hz). In other examples, the image sensor 110 can obtain images at a higher or lower frequency. As disclosed in further detail herein, the navigation system circuitry 200 analyzes each of the images as they are received and determines a best path or route for driving the vehicle 100 based on features detected in the images. Once a path is determined, the driving system circuitry 202 controls the vehicle 100 to navigate along the planned path. In the illustrated example, the driving system circuitry 202 includes wheel motor control circuitry 206 for controlling (e.g., activating) the motor(s) for powering the wheels 104 to drive the vehicle 100. The driving system circuitry 202 also includes steering motor control circuitry 208 that controls one or more steering motor(s) for steering the vehicle 100. In other examples, the driving system circuitry 202 can include other types of control circuitry based on the type of propulsion system and/or steering system implemented on the vehicle 100.

In the illustrated example of FIG. 2, the navigation system circuitry 200 includes semantic segmentation circuitry 210, projection circuitry 212, cost map generator circuitry 214, path planner circuitry 216, and machine learning model training circuitry 218. In some examples, each of the semantic segmentation circuitry 210, the projection circuitry 212, the cost map generator circuitry 214, the path planner circuitry 216, and the machine learning model training circuitry 218 are instantiated by programmable circuitry executing instructions and/or configured to perform operations, such as those represented by the flowchart(s) of FIG. 13, and/or other operations and/or workflows disclosed herein.

As an example operation, the image sensor 110 obtains an image of a scene of an area surrounding the vehicle 100. The semantic segmentation circuitry 210 analyzes the image to detect one or more types of features (e.g., objects, rocks, holes) in the image and generates a semantically segmented image (which may also be referred to as a semantic segmentation image) based on the detected features. The features may be hazardous objects (e.g., rocks) and/or other types of hazardous features (e.g., holes) to be avoided when planning a path for the vehicle 100.

Figure 3B:
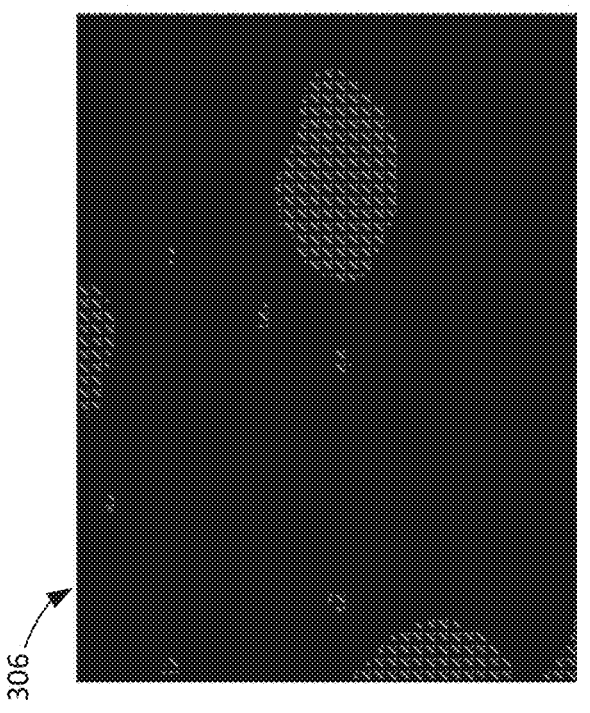
FIG. 3B is an example semantic segmentation image generated by the example navigation system circuitry of FIG. 2 based on the example image of FIG. 3A.
Figure 3A:
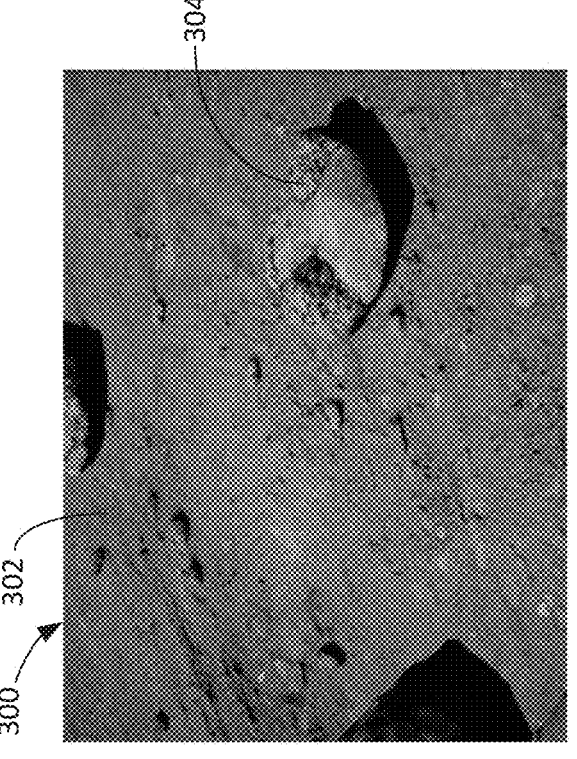
FIG. 3A is an example image obtained by the example image sensor of FIG. 1 showing a ground surface with rocks.

For example, FIG. 3A is an example image 300 taken by the image sensor 110 (FIG. 1). The image 300 shows a surface 302 (e.g., regolith) of a celestial body (e.g., moon) with a few rocks 304 (one of which is referenced) on the surface 302. It may be desired to avoid the rocks 304, because the rocks 304 may cause damage to the vehicle 100 and/or render the vehicle 100 inoperable (e.g., the vehicle 100 may become stuck or tip over). Therefore, in this example, the semantic segmentation circuitry 210 is configured to analyze the image 300 for rocks. The semantic segmentation circuitry 210 may be configured to detect rocks greater than a certain threshold size. The semantic segmentation circuitry 210 generates or produces a semantically segmented image, sometimes referred to as a mask. FIG. 3B shows an example semantically segmented image 306 generated by the semantic segmentation circuitry 210. As shown in FIG. 3B, the areas in the semantically segmented image 306 corresponding to rocks are labeled (in this example, by one color), while everything else in the semantically segmented image 306 is not labeled (in this example, colored black). As such, the labeled (colored) sections of the semantically segmented image 306 represent rocks identified by the semantic segmentation circuitry 210. In other examples, the identified features can be labeled or tagged with bounding boxes or other indicators.

In some examples, the semantic segmentation circuitry 210 is configured to detect or identify only one type of feature. For example, the semantic segmentation circuitry 210 may be configured to only identify rocks in the scene. This type of semantic segmentation is sometime referred to as a Boolean mask or binary class schema. In other examples, the semantic segmentation circuitry 210 is configured to detect or identify multiple types of features. For example, the semantic segmentation circuitry 210 may be configured to detect rocks, holes, and people. These features may be considered hazards to be avoided by the vehicle 100.

In some examples, the semantic segmentation circuitry 210 executes or implements a machine learning model 220 to detect the one or more types of features and generate the semantically segmented image 306. Referring back to FIG. 2, the machine learning model 220 is stored in the memory 204 on the vehicle 100. In other examples, the machine learning model 220 can be stored remotely (e.g., at a ground-based station). In some examples, the machine learning model 220 is a convolutional neural network (CNN). CNNs are advantageous for image analysis. In other examples, other types of machine learning models can be implemented, such as, but not limited to, a recurrent neural network (RNN), a long short-term memory (LSTM), or an artificial neural network (ANN). In some examples, the machine learning model 220 may be pre-trained. For example, the machine learning model 220 can be pre-trained using labeled images from other rovers and/or missions on a celestial body. Additionally or alternatively, the machine learning model 220 may be pre-trained based on simulated (artificial) images. In other examples, the machine learning model 220 may be trained during the rover mission. For example, during an initial portion of the mission, the image sensor 110 may obtain a plurality of images of the surrounding environment, and a person or machine may label the features of the images. The machine learning training circuitry 218 then trains the machine learning model 220 based on the labeled images. This may be advantageous because the machine learning model 220 is then trained based on the most relevant scenes from the surrounding environment.

Figure 4B:
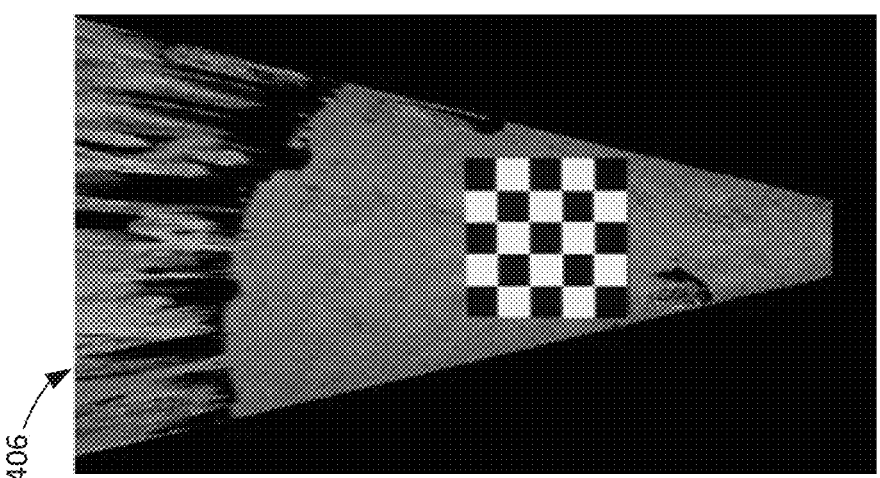
FIG. 4B is an example two-dimension (2D) map projection of the example semantic segmentation image of FIG. 4A as generated by the example navigation system circuitry of FIG. 2.
Figure 4A:
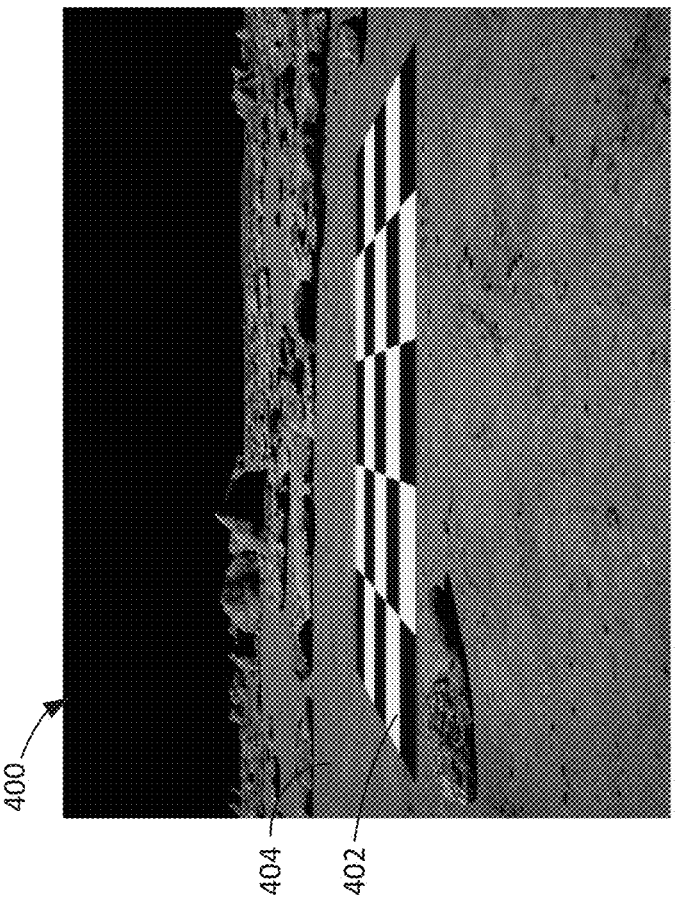
FIG. 4A is an image showing an example checker-board on a ground surface.

After the semantically segmented image 306 is generated, the projection circuitry 212 performs a homographic projection to project the semantically segmented image 306, including the identified features, from the perspective of the image sensor 110 to a two-dimensional (2D) map view. For example, FIG. 4A is an image 400 of a scene as taken by the image sensor 110. The image 400 shows a checkered grid 402 on a surface 404. Because the image sensor 110 is calibrated to the normal ground plane, the projection circuitry 212 can project the scene, including the checkered grid 402, into a two-dimensional (2D) map projection 406 as shown in FIG. 4B. The 2D map projection 406 is an overhead or birds-eye perspective of the scene in the image 400. In some examples, the projection circuitry 212 executes or uses a transformation equation or algorithm (e.g., a Mercator projection) to perform the projection. The 2D map projection 406 may also be referred to as a projected hazard map. In some examples, the projection circuitry 212 is to project the image 400 to the 2D map projection 406 based at least in part on the attitude of the vehicle 100 as determined by the IMU 112. For example, the vehicle 100 may be driving on an incline or decline, which can affect the perspective of the image sensor 110 relative to the ground plane. Therefore, the projection circuitry 212 uses the attitude to account for the fact the image 400 may be angled or skewed relative to the normal ground plane.

FIG. 5 shows another example image 500 taken by the image sensor 110. The image 500 is a scene of a surface 502 of a celestial body (e.g., the moon) with a rock 504 on the surface 502. An XYZ coordinate system is also shown. The XY plane is a horizontal plane corresponding to the surface 502, and the Z direction is the vertical direction. The semantic segmentation circuitry 210 detects and/or identifies the rock 504 and generates a semantically segmented image 506 shown in FIG. 5B. The semantically segmented image 506 includes a labeled portion 508 detected as the rock 504. Then, the projection circuitry 212 projects (e.g., using a homographic projection) the semantically segmented image 506 into a 2D map space or map coordinates. For example, the projection circuitry 212 can project the semantically segmented image 506 into an example 2D map projection 510 shown in FIG. 5C. The 2D map projection 510 shows the surface 502 in the XY plane (i.e., a map view). The portion 508 of the semantically segmented image 506 corresponding to the rock 504 is also projected onto the 2D map projection 510. The depth of the rock 504 in the Y direction is unknown, so the portion 508 corresponding to the rock 504 is extended or projected in the Y direction to the surface 502 behind the rock 504. As shown in FIG. 5C, the projection circuitry 212 also generates a grid on the 2D map projection 510. Each cell of the grid represents an area of the surface 502, such as 1 m×1 m area, but can be larger or smaller depending on the desired resolution.

Figure 6:
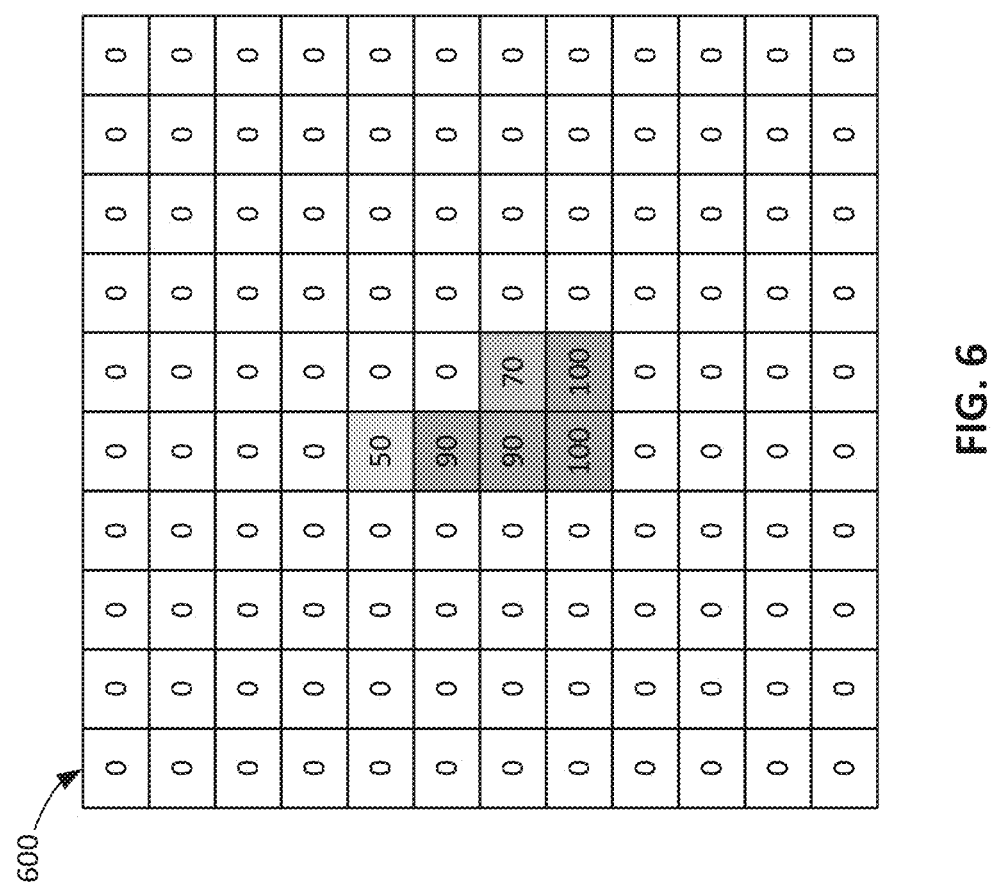

The cost map generator 214 then converts the 2D map projection 510 into a cost map and/or otherwise generates a cost map based on the 2D map projection. A cost map is a grid map of cells that are assigned certain values (sometimes referred to as costs) and can be used for generating or determining a path between two points. The values of the cells may indicate whether the area of the surface 502 corresponding to the cell is safe to drive on or has a potential hazard that should be avoided. In some examples, each cell contains only one of two values (e.g., a binary system), such as 0 or 1, where 0 indicates no hazardous feature (and, thus, a safe area to drive) and 1 indicates a possible feature (and, thus, an unsafe area to drive). The cells containing any portion of the identified features (e.g., the rock) may be labeled as 1, whereas the other cells may be labeled as 0. In other examples, the cells can have range or scale of values, such as from 0-100, indicating the percentage or likelihood that a feature is present in the cell. For example, FIG. 6 illustrates an example cost map 600 generated by the cost map generator 214 based on the 2D map projection 510 (FIG. 5C). The cost map 600 corresponds a 2D map of the area of the scene from the image 500 (e.g., the area in front of the vehicle 100). The cost map 600 has a grid of cells each corresponding to an area (e.g., a 1 m×1 m area) of the surface 502. In some examples, the cells are the same as the cells of the grid in the 2D map projection 510. As shown in FIG. 6, the cells in which the rock 504 is located (from FIG. 5C) have relatively high values (e.g., 100, 90, 70, and 50). These higher values indicate the corresponding areas of the terrain are more likely to contain the rock 504 (or other hazards) and should be avoided. The other surrounding cells have a value of 0, which indicates the surface 502 in those areas is relatively safe.

Figure 7:
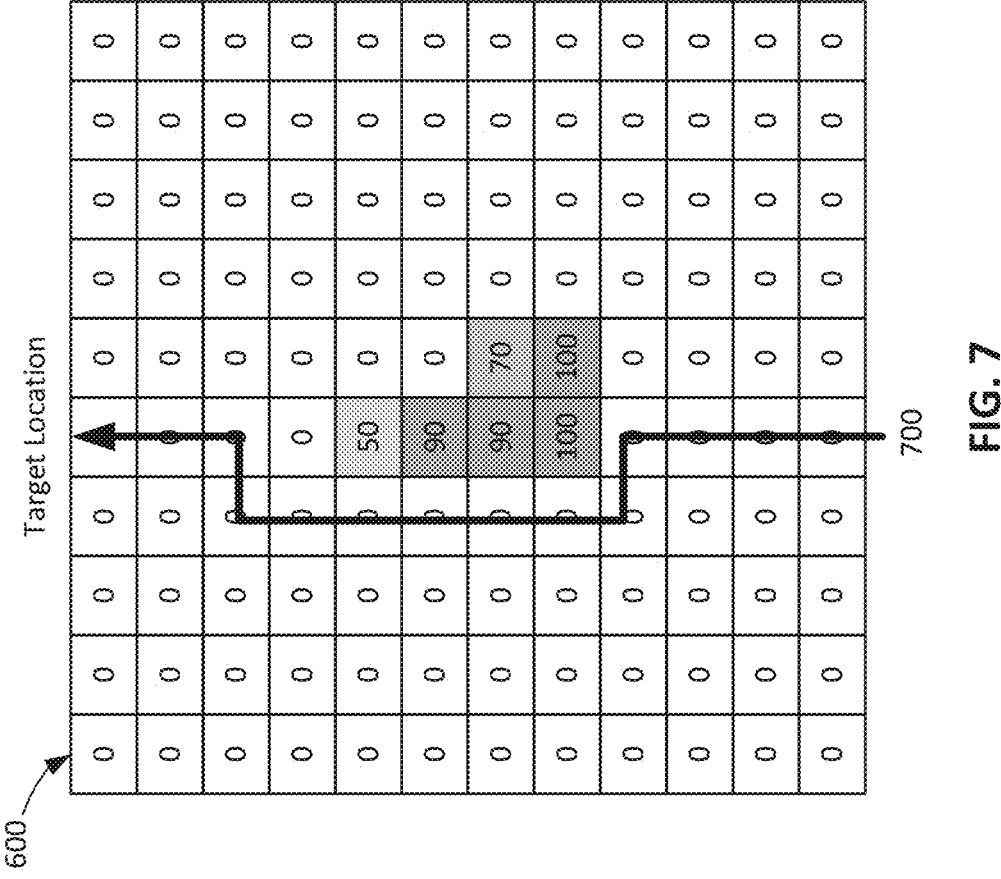
FIG. 7 shows the example cost map of FIG. 6 with an example path as determined by the example navigation system circuitry of FIG. 2.

The path planner circuitry 216 analyzes the cost map 600 using one or more algorithms (e.g., A*, D*, RRT, RRT*) and determines a path from the vehicle's current location to a target location based on the values of the cells of the cost map 600. For example, FIG. 7 illustrates an example path

700 that is determined by the path planner circuitry 216 and plotted on the cost map 600. As shown, the path 700 avoids the cells or areas with the higher values and, thus, avoids the areas of the surface 502 with potential rocks and other hazards.

After the path 700 is determined, the driving system circuitry 202 operates the wheels 104 to drive the vehicle 100 along the path 700. The image sensor 110 continues to obtain new images as the vehicle 100 is driving along the path 700. The new images may reveal new safe areas or hazardous features. As each new image is received, the navigation system circuitry 200 analyzes the images and updates the cost map 600 and the path 700. Therefore, the navigation system circuitry 200 continuously accesses new images from the image sensor 110 and updates the path 700 based on the new images. The path 700 may change as new images are received. For example, as the vehicle 100 is near the side of the rock 504, the new images may reveal how deep or shallow the rock 504 is and, thus, the path 700 can be adjusted based on the new information. As discussed above, in some examples, the image sensor 110 obtains images at a relatively high frequency, such as 10 Hz (but in other examples can be higher or lower). As such, the navigation system is quickly and continuously analyzing the terrain and adjusting the path of the vehicle 100 to avoid hazardous features and objects.

Figure 8:
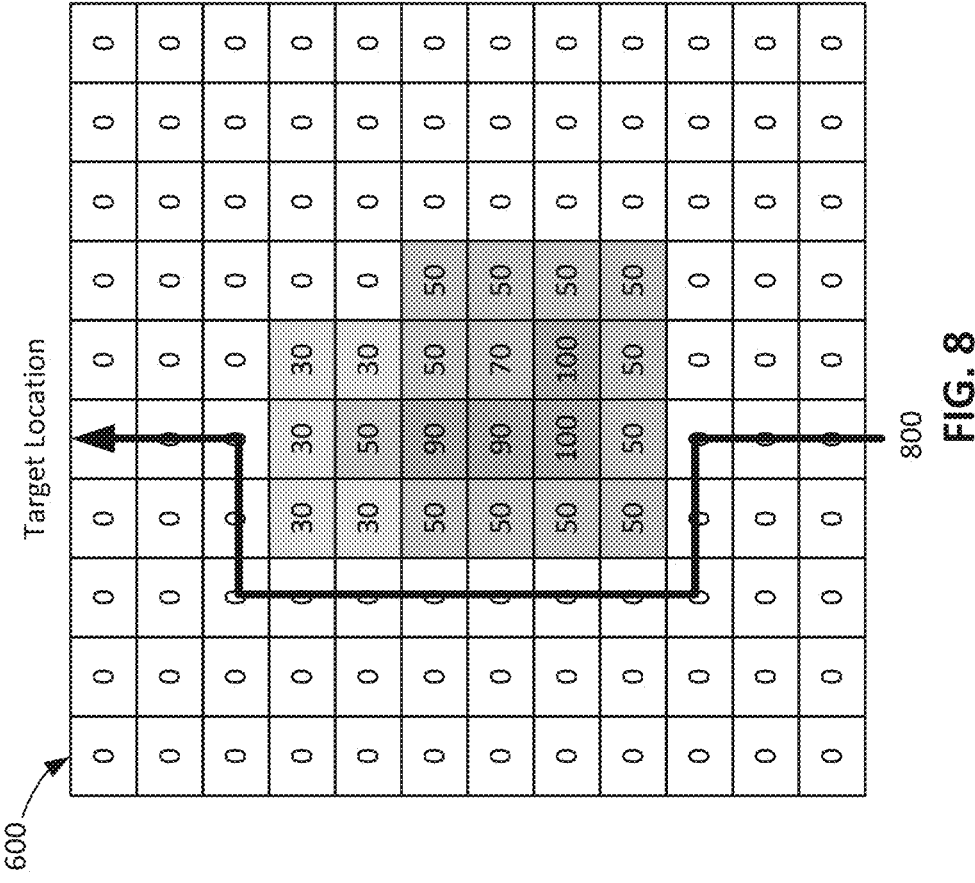
FIG. 8 shows another version of the example cost map and the example path of FIG. 7.

In some examples, the semantic segmentation circuitry 210 generates boundaries or layers around the identified features, similar to a heat map. These boundaries or layers can represent various risk levels. When projected into the cost map, these boundaries can provide additional area around the features. For example, it may be desirable to ensure the vehicle 100 remains a certain distance from certain types of objects, such as the rock 504. FIG. 8 shows an example of the cost map 600 in which the cells around the rock 504 have higher values compared to the values in FIGS. 6 and 7. This results in a path 800 that has moved further away from the area with the rock 504, thereby ensuring the vehicle 100 remains a certain distance from the rock 504. In some examples, different types of features may have different thresholds. For example, it may be desired to ensure the vehicle 100 remains a greater distance from a person detected in the scene than a rock detected in the scene. Therefore, when a person is detected, the cells in the cost map 600 around the person may have higher values. This ensures additional room or space is kept around the person to avoid colliding with the person.

The example technique implemented by the navigation system is advantageous over known navigation systems because the navigation system circuitry 200 uses semantic segmentation to actually identify the type of features or object in the scene. Known stereo camera techniques only determine the distance to features in the image, and do not differentiate between different types of features. The example semantic segmentation process provides additional information that can be used when generating the cost map 600 to assess the levels of safety. For example, some types of objects, such as people, may be considered a higher level to avoid. As such, the cells with people and the surrounding cells may have higher values to ensure the vehicle 100 remains at a safe distance from the people. On the other hand, other types of features, such as rocks, may have lower values around the cells because accidental collision with a rock may be less important than collision with a person. As another example, in some instances, the semantic segmentation can be used to determine the type of material or composition of the surface 502. For example, the image sensor 110 may be implemented as a thermal infrared sensor (which can measure surface temperature) or a hyperspectral imaging sensor (which can detect the composition of the surface 502). Some surface conditions or compositions (e.g., hot, cold, icy, rough surfaces, etc.) may cause the vehicle 100 to become stuck or lose traction, whereas other conditions or compositions may be relatively hard and are ideal for driving. Therefore, the semantic segmentation process can be used to identify and value these cells in the cost map 600 for better planning.

Figure 9:
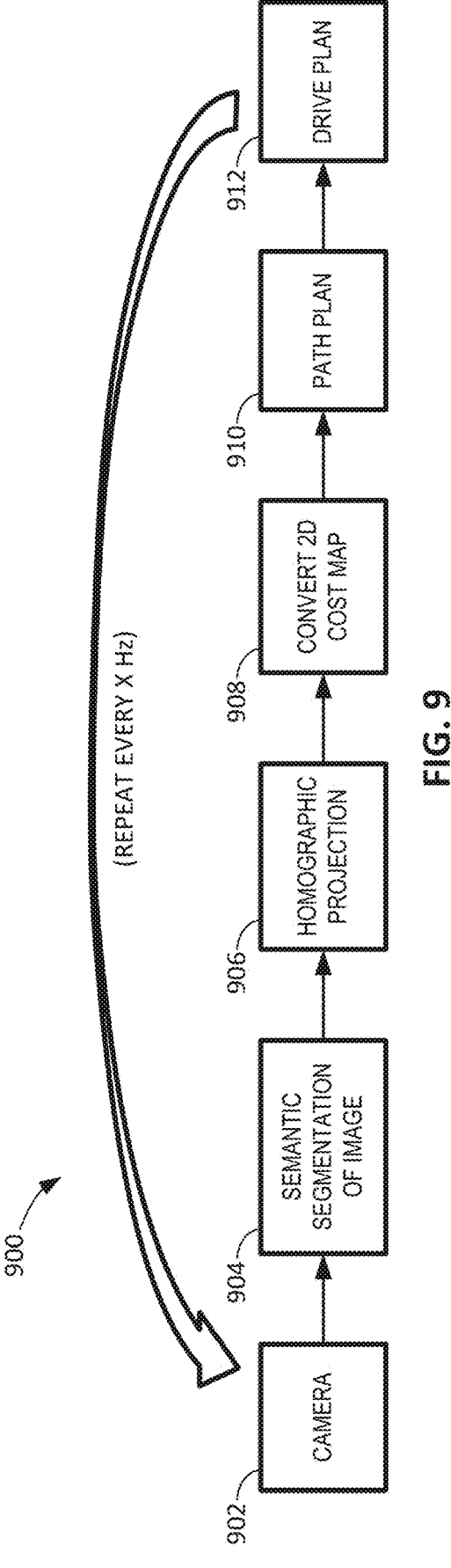
FIG. 9 shows an example workflow implemented by the example electronic control system of FIG. 1 using one image sensor.

FIG. 9 is an example workflow 900 implemented by the electronic control system 106. Based on a calibrated imaging sensor and an input image, the electronic control system 106 can effectively analyze a scene and plan a path to avoid any detected hazards of interest. At block 902, a camera, such as the image sensor 110, obtains an image. The image can also be from one of the cameras 109a, 109b of the stereo camera 108. At block 904, the semantic segmentation circuitry 210 detects one or more types of features (e.g., rocks, holes, people) in the image and generates a semantically segmented image, such as the semantically segmented image 506. The features can include hazardous objects, the ground, and/or other objects in the navigation scene. At block 906, the projection circuitry 212 executes a transformation algorithm to project the semantically segmented image into a 2D map projection, such as the 2D map projection 510. At block 908, the cost map generator 214 converts the 2D map projection to a cost map, such as the cost map 600. At block 910, the path planner circuitry 216 analyzes the cost map and determines a path to the target location. At block 912, the drive system circuitry 202 activates one or more motors to drive and steer the vehicle 100 along the path. The example workflow 900 is repeated at a certain frequency as new images are obtained.

Figures 10, 11:
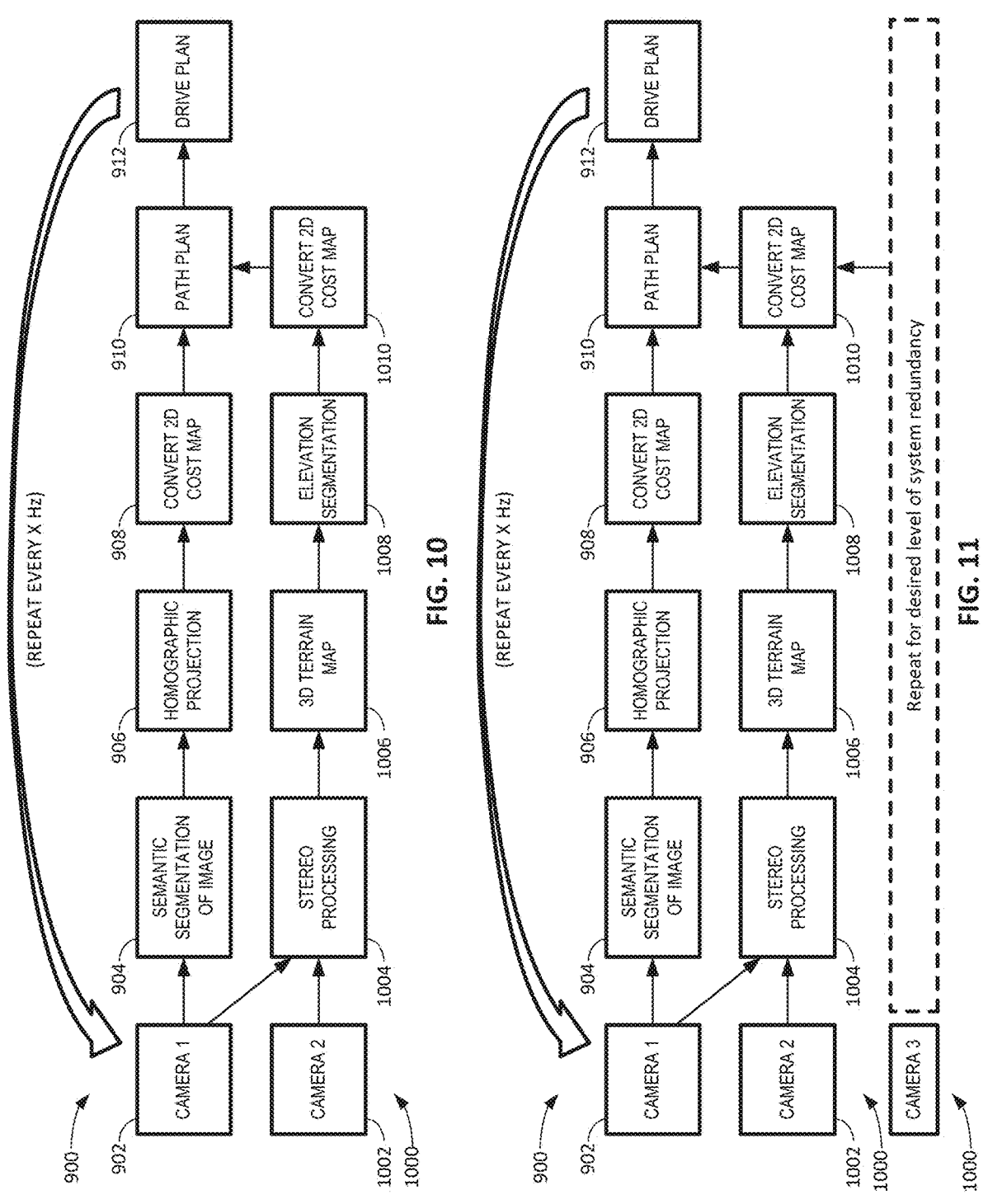
FIG. 10 shows an example workflow implemented by the example electronic control system of FIG. 1 using two image sensors.
FIG. 11 shows an example workflow implemented by the example electronic control system of FIG. 1 using more than two image sensors.

FIG. 10 includes a second workflow 1000 when a second camera is available. The second workflow 1000 can be used to supplement the path planning in the first workflow 900. The first and second cameras may correspond to the cameras 109a, 109b of the stereo camera 108, or one of the cameras 109a, 109b of the stereo camera 108 and the image sensor 110. Blocks 902-912 of the first workflow 900 are the same or similar as described above. At block 1002 a second image is obtained from the second camera. At block 1004, the images from the first and second cameras are processed by the navigation system circuitry 200 via a stereo processing technique. At block 1006, the navigation system circuitry 200 generates a three-dimensional (3D) terrain map. At block 1008, the navigation system circuitry 200 performs an elevation segmentation. At block 1010, the navigation system circuitry 200 converts the elevation segmentation to a 2D cost map. At block 910, the 2D cost map from the workflow 1000 is used to supplement or augment the path planning at block 910. In some examples, multiple cost maps are fused together for higher system reliability. Therefore, in some examples, the navigation system circuitry 200 can determine the path based at least in part on images from the stereo camera 108.

FIG. 11 shows an example workflow in which additional cameras are available. As shown, the example workflow 1000 can be repeated for each additional camera that is available. This provides a higher level of system redundancy and accuracy.

Figure 12:
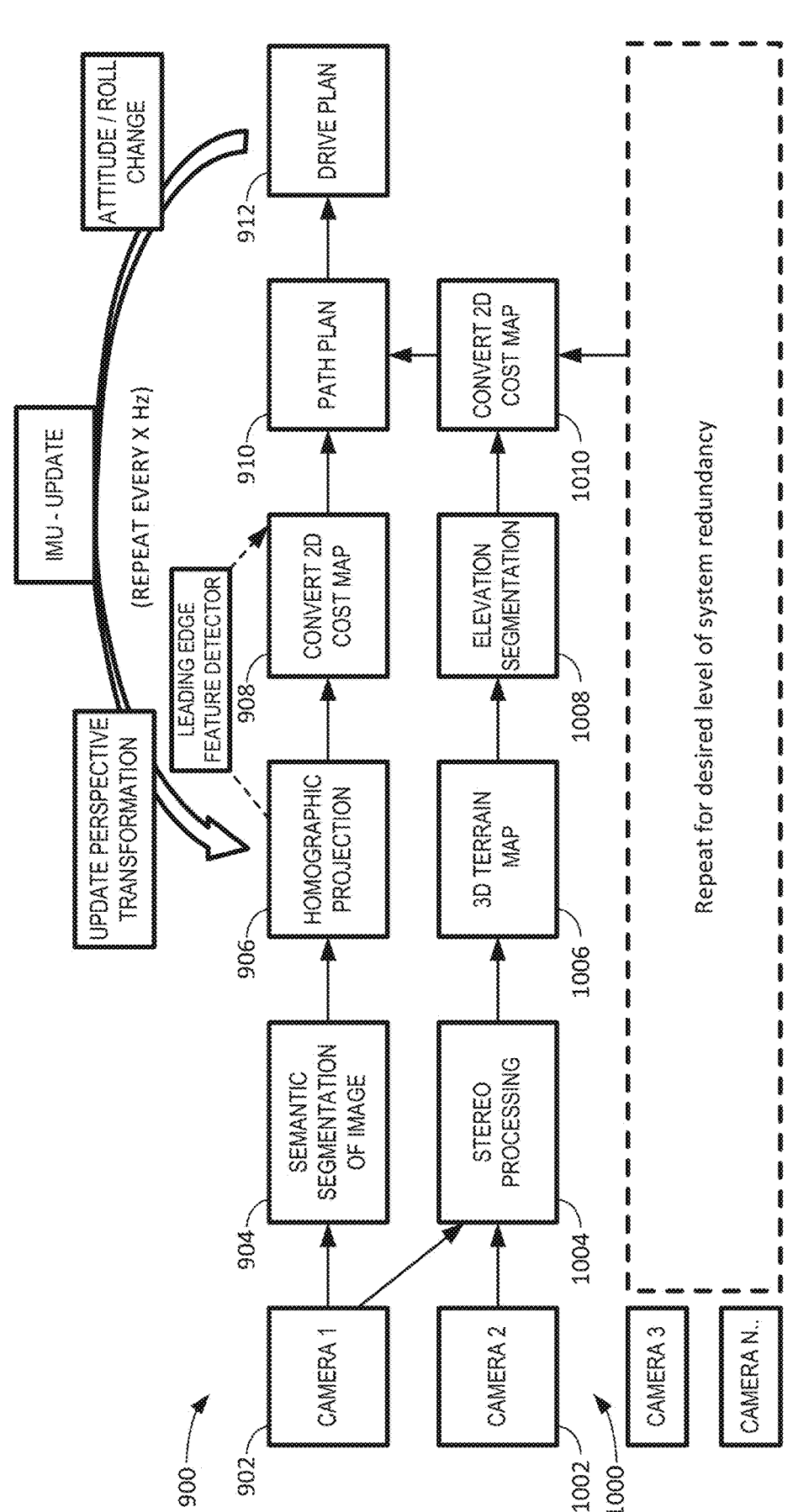
FIG. 12 shows an example workflow implemented by the example electronic control system of FIG. 1 with multiple image sensors and using input from an example inertial measurement unit (IMU).

FIG. 12 shows the workflow of FIG. 11, in which multiple cameras are available. Also, in some examples, the attitude and/or roll change of the vehicle 100 can be used by the navigation system circuitry 200 to perform the homographic projection. The attitude and/or roll change of the vehicle 100 is detected by the IMU 112 (IMU). The attitude and/or roll change can be used to update the perspective of the projection at block 906. For instance, when driving up an incline or down a decline, the view from the image sensor 110 is angled (e.g., skewed) relative to the ground (horizontal) plane. As such, the projection process is updated to account for this attitude and/or roll change of the vehicle 100. In some examples, the cost map generator circuitry 214 executes a leading edge detection algorithm to smooth out the process of generating the cost map. The leading edge detection algorithm finds the leading edge of the detected/identified objects and uses this information to further enhance the 2D cost map (e.g., by weighting the leading edge with a higher risk value).

While an example manner of implementing the electronic control system 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the navigation system circuitry 200, the example driving system circuitry 202, the example wheel motor control circuitry 206, the example steering motor control circuitry 208, the example semantic segmentation circuitry 210, the example projection circuitry 212, the example cost map generator circuitry 214, the example path planner circuitry 216, the example machine learning model training circuitry 218, and/or, more generally, the example electronic control system 106 of FIG. 2, may be implemented by hardware alone or by hardware in combination with software and/or firmware. Thus, for example, any of the example navigation system circuitry 200, the example driving system circuitry 202, the example wheel motor control circuitry 206, the example steering motor control circuitry 208, the example semantic segmentation circuitry 210, the example projection circuitry 212, the example cost map generator circuitry 214, the example path planner circuitry 216, the example machine learning model training circuitry 218, and/or, more generally, the example electronic control system 106, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example electronic control system 106 of FIG. 2 may include one or more elements, processes, and/or devices in addition to, or instead of, those illustrated in FIG. 2, and/or may include more than one of any or all of the illustrated elements, processes and devices.

Figure 13:
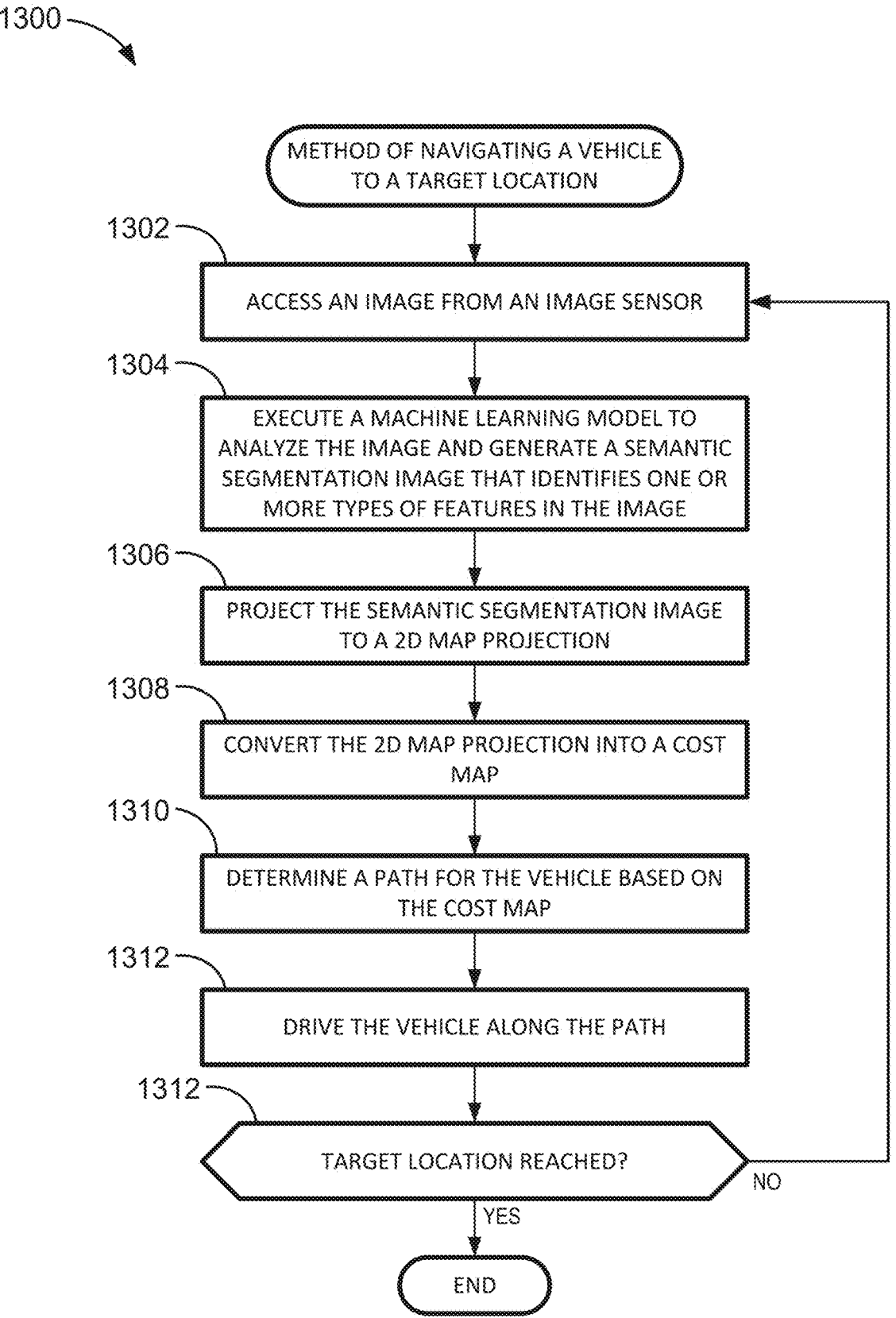
FIG. 13 is a flowchart representative of example machine readable instructions and/or example operations that may be executed, instantiated, and/or performed by example programmable circuitry to implement the example electronic control system of FIGS. 1 and 2.
Figure 14:
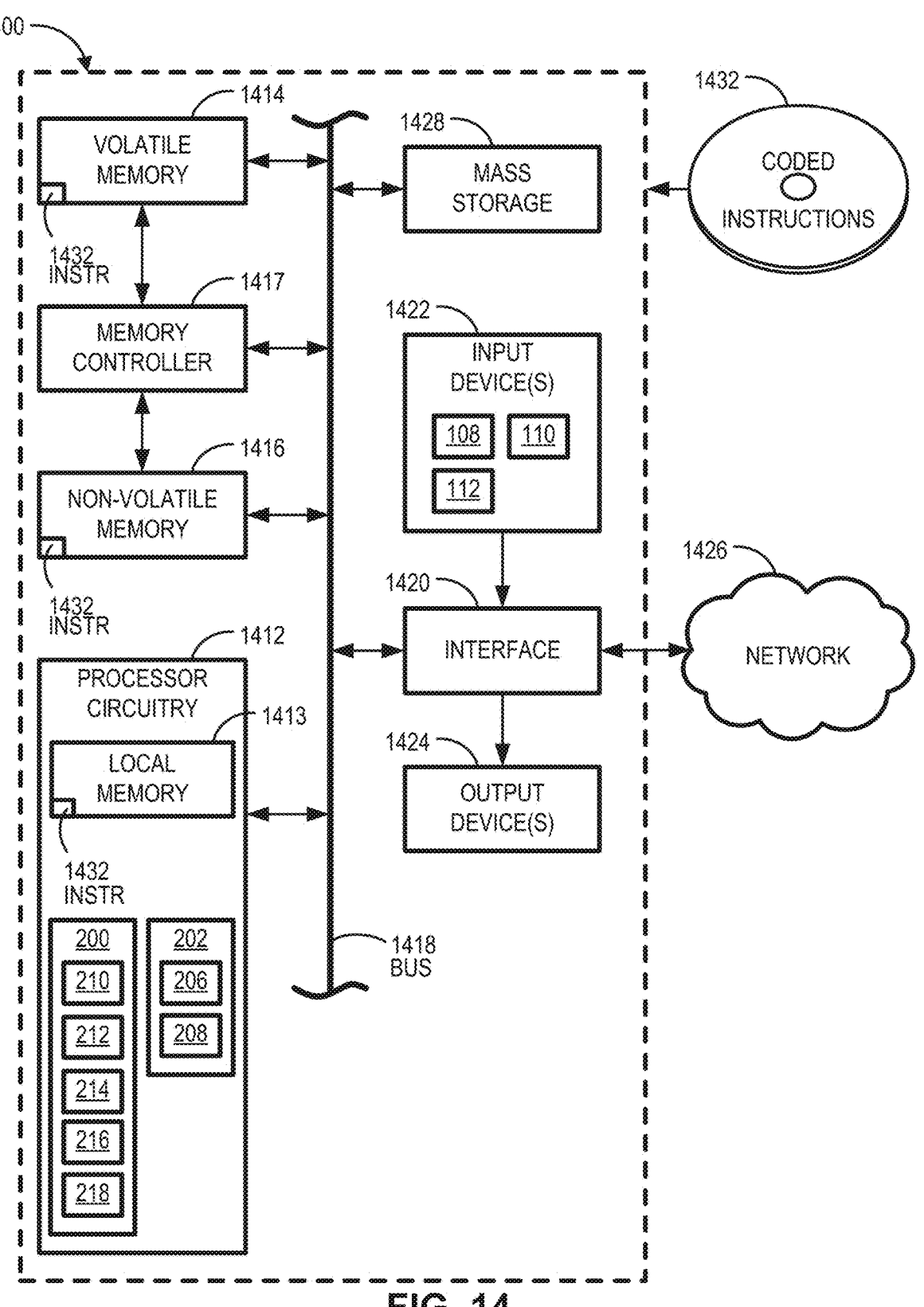
FIG. 14 is a block diagram of an example processing platform including programmable circuitry structured to execute, instantiate, and/or perform the example machine readable instructions and/or perform the example operations of FIG. 13 to implement the example electronic control system of FIGS. 1 and 2.

A flowchart representative of example machine readable instructions, which may be executed by programmable circuitry to implement and/or instantiate the electronic control system 106 of FIG. 2 and/or representative of example operations which may be performed by programmable circuitry to implement and/or instantiate the electronic control system 106 of FIG. 2, is shown in FIG. 13. The machine readable instructions may be one or more executable programs or portion(s) of one or more executable programs for execution by programmable circuitry such as the programmable circuitry 1412 shown in the example programmable circuitry platform 1400 discussed below in connection with FIG. 14 and/or may be one or more function(s) or portion(s) of functions to be performed by the example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 13, many other methods of implementing the example electronic control system 106 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 13 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 13 is a flowchart representative of example machine readable instructions and/or example operations 1300 that may be executed, instantiated, and/or performed by programmable circuitry to autonomously navigate a vehicle, such as the vehicle 100, to a target location. The example machine-readable instructions and/or the example operations 1300 of FIG. 13 begin at block 1302, at which the electronic control system 106 accesses an image from an image sensor. In some examples, the navigation system circuitry 200 receives the image directly from the image sensor. In other examples the navigation system circuitry 200 may access the image from the memory 204. The image is of a scene of an area surrounding the vehicle 100. In some examples, the image is from the image sensor 110. In some examples, the image sensor 110 is used as a back-up sensor if the stereo camera 108 fails. In other examples, the image may be obtained by one of the cameras 109a, 109b from the stereo camera 108, such as if the other camera has failed or is inoperable. In still other examples, the images from the image sensor 110 can be analyze and augmented with the images of the stereo camera 108 for improved navigation performance.

At block 1304, the semantic segmentation circuitry 210 executes the machine learning model 220 to analyze the image and generate a semantically segmented image that identifies one or more types of features in the image. For example, as shown in FIGS. 5A and 5B, the semantic segmentation circuitry 210 analyzes the image 500, identifies one or more features in the image 500, and generates the semantically segmented image 506 based on the image 500. The semantically segmented image 506 identifies the 508 portion(s) of the image containing the identified features, such as the rock 504.

At block 1306, the projection circuitry 212 projects the semantically segmented image to a 2D space or map coordinates. In some examples, a 2D map projection image is generated, which is an overhead or map view of the area in the scene of the image. For example, the projection circuitry 212 can project the semantically segmented image into a 2D map projection. For example, as shown in connection with FIGS. 5B and 5C, the projection circuitry 212 executes a transformation algorithm to project the semantically segmented image 506 to the 2D map projection 510.

At block 1308, the cost map generator circuitry 214 converts the 2D map projection into a cost map. For example, as shown in FIG. 6, the cost map generator circuitry 214 converts the 2D map projection 510 into the cost map 600. At block 1310, the path planner circuitry 216 determines a path for the vehicle 100 based on the cost map 600. An example path 700 is shown in FIG. 7. At block 1312, the drive system circuitry 202 operates one or more motors (or other devices) of the vehicle 100 to drive and steer the vehicle 100 along the path 700.

At block 1314, the path planner circuitry 216 determines if the target location is reached. This may be based on location information from one or more sensors (e.g., a global position system (GPS) sensor). If the target location has not been reached, the example process is repeated as a new image is obtained. The example process can be repeated at a certain frequency, such as 10 hz. Therefore, the navigation system circuitry 200 continuously accesses new images from the image sensor and updates the path based on the new images. Otherwise, if the target location is reached, the example process ends.

Therefore, the example process successfully detects hazardous features in a scene and plans a path for autonomously driving the vehicle 100 to avoid such features. The example process can be based solely on images from a single sensor. However, in other examples, if one or more other sensors are available, the analysis and cost map can be updated with other features from other images.

FIG. 1400 is a block diagram of an example programmable circuitry platform 1400 structured to execute and/or instantiate the example machine-readable instructions and/or the example operations of FIG. 13 to implement the electronic control system 106 of FIG. 2. The programmable circuitry platform 1400 can be, for example, a vehicle electronic control unit (ECU), a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing and/or electronic device.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs, microprocessors, CPUs, GPUs, DSPs, and/or microcontrollers from any desired family or manufacturer. The programmable circuitry 1412 may be implemented by one or more semiconductor based (e.g., silicon based) devices. In this example, the programmable circuitry 1412 implements the navigation system circuitry 200, including the example semantic segmentation circuitry 210, the example projection circuitry 212, the example cost map generator circuitry 214, the example path planner circuitry 216, and the example machine learning model training circuitry 218, and the example driving system circuitry 202, including the example wheel motor control circuitry 206 and the example steering motor control circuitry 208.

The programmable circuitry 1412 of the illustrated example includes a local memory 1413 (e.g., a cache, registers, etc.). The programmable circuitry 1412 of the illustrated example is in communication with main memory 1414, 1416, which includes a volatile memory 1414 and a non-volatile memory 1416, by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417. In some examples, the memory controller 1417 may be implemented by one or more integrated circuits, logic circuits, microcontrollers from any desired family or manufacturer, or any other type of circuitry to manage the flow of data going to and from the main memory 1414, 1416.

The programmable circuitry platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1422 are connected to the interface circuitry 1420. The input device(s) 1422 permit(s) a user (e.g., a human user, a machine user, etc.) to enter data and/or commands into the programmable circuitry 1412. In this example, the input device(s) include the stereo camera 108, the image sensor 110, and the IMU 112. Additionally or alternatively, the input device(s) 1422 can be implemented by, for example, an audio sensor, a microphone, a keyboard, a button, a mouse, a touchscreen, a trackpad, a trackball, an isopoint device, and/or a voice recognition system.

One or more output devices 1424 are also connected to the interface circuitry 1420 of the illustrated example. The output device(s) 1424 can be implemented, for example, one or more motors for driving the wheels 104 and/or steering the vehicle 100, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1400 of the illustrated example also includes one or more mass storage discs or devices 1428 to store firmware, software, and/or data. Examples of such mass storage discs or devices 1428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs. The memory 204 of FIG. 2 can be implemented by any of the mass storage device 1428, the local memory 1413, the volatile memory 1414, and/or the non-volatile memory 1416.

The machine readable instructions 1432, which may be implemented by the machine readable instructions of FIG. 13, may be stored in the mass storage device 1428, in the volatile memory 1414, in the non-volatile memory 1416, and/or on at least one non-transitory computer readable storage medium such as a CD or DVD which may be removable.

As used herein, unless otherwise stated, the term "above" describes the relationship of two parts relative to a celestial body on which the described parts are located. A first part is above a second part, if the second part has at least one part between the celestial body and the first part. Likewise, as used herein, a first part is "below" a second part when the first part is closer to the celestial body than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

From the foregoing, it will be appreciated that example systems, apparatus, articles of manufacture, and methods have been disclosed that enable accurate autonomous navigation of a vehicle based on images from a single image sensor (e.g., a camera). Examples disclosed herein can be implemented on celestial vehicles, such as rover or a Lunar Terrain Vehicle (LTV). Examples disclosed herein can also be implemented on Earth-based vehicles (e.g., self driving cars) and/or robots (e.g., AGV robots). The example techniques disclosed herein can be used to provide redundancy in the event of failure of one or more other active or passive sensors. Alternatively, the example techniques can be used to reduce or eliminate the need for other sensor systems on a vehicle, thereby reducing weight, costs, and power consumption. Lower power consumption can be important, especially with rovers that have limited power because of solar cycles. Some examples disclosed herein utilize machine learning for scene awareness. Examples disclosed herein provide a machine learned perception system, which results in adaptive perception of the scene after deployment.

Examples and combinations of examples disclosed herein include the following:

Example 1 is a vehicle comprising: an image sensor to obtain an image of a scene of an area surrounding the vehicle; and navigation system circuitry to: analyze the image and generate a semantically segmented image that identifies one or more types of features in the image; project the semantically segmented image to a two-dimensional (2D) map projection; convert the 2D map projection into a cost map; and determine a path for the vehicle based on the cost map.

Example 2 includes the vehicle of Example 1, wherein the navigation system circuitry is to analyze the image and generate the semantically segmented image by executing a machine learning model, the machine learning model stored in a memory on the vehicle.

Example 3 includes the vehicle of Example 2, wherein the machine learning model is a convolutional neural network (CNN).

Example 4 includes the vehicle of any of Examples 1-3, wherein the navigation system circuitry is to project the semantically segmented image to the 2D map projection by using a transformation equation.

Example 5 includes the vehicle of any of Examples 1-4, further including an inertial measurement unit (IMU) to determine an attitude of the vehicle, and wherein the navigation system circuitry is to project the semantically segmented image to the 2D map projection based at least in part on the attitude of the vehicle as determined by the IMU.

Example 6 includes the vehicle of any of Examples 1-5, wherein the one or more types of features include rocks.

Example 7 includes the vehicle of any of Examples 1-5, wherein the navigation system circuitry is to continuously access new images from the image sensor and update the path based on the new images.

Example 8 includes the vehicle of any of Examples 1-7, wherein the image sensor is an RGB camera.

Example 9 includes the vehicle of any of Examples 1-7, wherein the image sensor is a thermal infrared sensor.

Example 10 includes the vehicle of any of Examples 1-7, wherein the image sensor is a hyperspectral imaging sensor.

Example 11 includes the vehicle of any of Examples 1-10, wherein the image sensor is a first image sensor of a pair of image sensors of a stereo camera.

Example 12 includes the vehicle of any of Examples 1-11, further including a stereo camera, wherein the navigation system circuitry is to determine the path based at least in part on images from the stereo camera.

Example 13 includes the vehicle of any of Examples 1-12, wherein the vehicle is a rover to be used on a celestial body.

Example 14 includes the vehicle of any of Examples 1-13, further including: one or more wheels; and driving system circuitry to operate the wheels to drive the vehicle along the path.

Example 15 is a non-transitory machine readable storage medium comprising instructions that, when executed, cause programmable circuitry of a vehicle to: access an image of a scene of an area surrounding the vehicle, the image obtained by an image sensor on the vehicle; analyze the image and generate a semantically segmented image that identifies one or more types of features in the image; project the semantically segmented image to a two-dimensional (2D) map projection; convert the 2D map projection to a cost map; and determine a path for the vehicle based on the cost map.

Example 16 includes the non-transitory machine readable storage medium of Example 15, wherein the instructions, when executed, cause the programmable circuitry to analyze the image and generate the semantically segmented image by executing a machine learning model.

Example 17 includes the non-transitory machine readable storage medium of Example 16, wherein the machine learning model is a convolution neural network (CNN).

Example 18 includes the non-transitory machine readable storage medium of any of Examples 15-17, the one or more types of features include rocks.

Example 19 includes the non-transitory machine readable storage medium of any of Examples 15-18, wherein the vehicle includes an inertial measurement unit (IMU) to determine an attitude of the vehicle, and wherein the instructions, when executed, cause the programmable circuitry to project the semantically segmented image to the 2D map projection based at least in part on the attitude of the vehicle.

Example 20 includes the non-transitory machine readable storage medium of any of Examples 15-19, wherein the vehicle includes one or more wheels, and wherein the instructions, when executed, cause the programmable circuitry to operate the wheels to drive the vehicle along the path.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A vehicle comprising:
an image sensor to obtain an image of a scene of an area of a celestial body surrounding the vehicle, wherein the vehicle includes a rover on the celestial body;
one or more wheels;
driving system circuitry; and
navigation system circuitry to:
generate, based on the image, a semantically segmented image that identifies one or more types of features in the image;
determine an attitude of the vehicle based on output from an inertial measurement unit (IMU);

project the semantically segmented image to a two-dimensional (2D) map projection based on the attitude to account for at least one of an angle or a skew of the image;

convert the 2D map projection into a cost map, the cost map defining a grid of values corresponding to at least one hazard of the area of the celestial body;

determine a path for the vehicle based on the cost map; and control the driving system circuitry to operate the one or more wheels to drive the vehicle along the determined path.

2. The vehicle of claim 1, wherein the navigation system circuitry is to generate the semantically segmented image by executing a machine learning model, the machine learning model stored in a memory on the vehicle.

3. The vehicle of claim 2, wherein the machine learning model is a convolutional neural network (CNN).

4. The vehicle of claim 2, wherein the machine learning model is trained based on prior missions on the celestial body.

5. The vehicle of claim 2, wherein the machine learning model is trained during operation of the vehicle on the celestial body.

6. The vehicle of claim 1, wherein the navigation system circuitry is to project the semantically segmented image to the 2D map projection by using a transformation equation.

7. The vehicle of claim 1, wherein the one or more types of features include rocks.

8. The vehicle of claim 1, wherein the navigation system circuitry is to continuously access new images from the image sensor and update the path based on the new images.

9. The vehicle of claim 1, wherein the image sensor is an RGB camera.

10. The vehicle of claim 1, wherein the image sensor is a thermal infrared sensor.

11. The vehicle of claim 1, wherein the image sensor is a hyperspectral imaging sensor.

12. The vehicle of claim 1, wherein the image sensor is a first image sensor of a pair of image sensors of a stereo camera.

13. The vehicle of claim 1, wherein the image sensor includes a stereo camera, and wherein the navigation system circuitry is to determine the path based at least in part on the image from the stereo camera.

14. The vehicle of claim 1, wherein the 2D map projection is converted into the cost map with a leading edge detection algorithm.

15. A non-transitory machine readable storage medium comprising instructions that, when executed, cause programmable circuitry of a vehicle to:

access an image of a scene of an area of a celestial body surrounding the vehicle, the image obtained by an image sensor on the vehicle, wherein the vehicle includes a rover on the celestial body;

generate, based on the image, a semantically segmented image that identifies one or more types of features in the image;

determine an attitude of the vehicle based on output from an inertial measurement unit (IMU);

project the semantically segmented image to a two-dimensional (2D) map projection based on the attitude to account for at least one of an angle or a skew of the image;

convert the 2D map projection to a cost map, the cost map defining a grid of values corresponding to at least one hazard of the area of the celestial body;

determine a path for the vehicle based on the cost map; and operate at least one wheel of the vehicle to drive the vehicle along the determined path.

16. The non-transitory machine readable storage medium of claim 15, wherein the instructions, when executed, cause the programmable circuitry to generate the semantically segmented image by executing a machine learning model.

17. The non-transitory machine readable storage medium of claim 16, wherein the machine learning model is a convolution neural network (CNN).

18. The non-transitory machine readable storage medium of claim 15, wherein the one or more types of features include rocks.

* * * * *